United States Patent [19]
Kähkipuro et al.

[11] Patent Number: 4,621,222
[45] Date of Patent: Nov. 4, 1986

[54] METHOD FOR IMPROVING THE DYNAMIC CONVERTER DRIVE FOR A DIRECT CURRENT ELEVATOR MOTOR

[75] Inventors: Matti Kähkipuro; Heimo Mäkinen, both of Hyvinkää , Finland

[73] Assignee: Elevator GmbH, Baar, Switzerland

[21] Appl. No.: 758,975

[22] Filed: Jul. 25, 1985

[51] Int. Cl.[4] .............................................. H02P 7/16

[52] U.S. Cl. .................................... 318/146; 318/317; 187/29 R; 290/14

[58] Field of Search ........................ 318/146, 147, 317; 187/29 R; 290/14

[56] References Cited

U.S. PATENT DOCUMENTS 4,143,280 3/1979 Kuehn, Jr. et al. ............. 318/147 X
4,171,505 10/1979 Shima et al. ..................... 318/146 X
4,263,988 4/1981 Inaba et al. ...................... 318/146 X

*Primary Examiner*—B. Dobeck
*Attorney, Agent, or Firm*—Browdy and Neimark

[57] ABSTRACT

The present invention concerns a method for improving the dynamic converter drive for a direct current elevator motor, in which the said motor is controlled by adjusting the magnetization of the generator linked to the lifting motor, such adjustment being achieved by means of a power electronics stage controlled by the elevator speed control system, using at least elevator speed and motor current consumption (or other current information proportional thereto) as feedback parameters. The intended improvement is achieved by measuring the current values at two different points in the magnetizing circuit of the generator by means of current measuring resistors, the result of the measurement at the first point indicating the generator magnetizing current value, which is supplied to the speed control unit of the speed control system, and the current measured at the second point representing the thyristor bridge current value, which is supplied to the circuit responsible for bridge changeover control in the said power electronics stage.

4 Claims, 4 Drawing Figures

METHOD FOR IMPROVING THE DYNAMIC CONVERTER DRIVE FOR A DIRECT CURRENT ELEVATOR MOTOR

BACKGROUND OF THE INVENTION

In areas where heavy current is supplied to the buildings through direct current mains, elevator drive systems are naturally based on the use of direct current and, almost always, direct current motors. In such areas, e.g. in New York City, besides the direct current supply, there is usually a 220 V a.c. supply available for lighting purposes. Where direct current is the chief energy form, modern a.c. converters cannot be used. Under these circumstances there are considerably fewer alternatives for elevator motor drives, and modernization of existing drives—most commonly dynamic Ward-Leonard converters—is often seen as a more rational solution than complete renewal.

OBJECT OF THE INVENTION

The object of the present invention is to provide a method for adding modern control electronics to the dynamic converter of a direct current elevator motor to achieve a faster and more accurate motor speed control and a completely controlled bridge changeover sequence.

Another object of the invention is to achieve a new type of Ward-Leonard drive for direct current motors, using a simplified magnetizing circuit in the converter generator and also eliminating short-circuit conditions in the semiconductor switches, such as thyristors, involved. In prior-art Ward-Leonard drives employing two thyristor bridges connected in parallel across the magnetizing winding of the generator, the circulating and short circuit currents that may be set up at switch-on or during bridge changeover have to be limited by connecting mixer resistors or inductors between the thyristor bridges. These additional components are expensive because they have to be rated for a high instantaneous power and endure the heat generated in them.

SUMMARY OF THE INVENTION

The present invention concerns a method for improving the dynamic converter drive for a direct current elevator motor, in which the said motor is controlled by adjusting the magnetization of the generator linked to the lifting motor, such adjustment being achieved by means of a power electronics stage controlled by the elevator speed control system, using at least elevator speed and motor current consumption (or other current information proportional thereto) as feedback parameters. The improvement intended by the invention is achieved by measuring the current values at two different points in the magnetizing circuit of the generator by means of current measuring resistors. The result of the measurement at the first measuring point indicates the generator magnetizing current value, and this information is fed to the speed control unit of the speed control system. The current measured at the second point represents the thyristor bridge current value, and this information is supplied to the circuit responsible for bridge changeover control in the said power electronics stage. In this way the invention achieves a simple solution that is free of circulating currents, eliminates the possiblity of a short circuit in the magnetizing circuit and enables the bridge changeover to be performed in a controlled manner at exactly the right instant.

An advantageous embodiment of the invention is characterized in that the power electronics stage consists of two thyristor bridges rectifying the magnetizing current in opposite directions, the bridge changeover being accomplished by means of a current direction control unit on the minimum pulse principle at the instant when the information from the aforesaid second current measuring point indicates that the current through the thyristor bridges is zero. By using four-quadrant thyristor bridges and the minimum pulse principle, to be described in greater detail below, in the thyristor bridge changeover sequence, a higher switching speed is achieved, because energy is fed back to the network during the changeover, which means a faster current decline in comparison with conventional methods.

The Ward-Leonard drive magnetizing circuit of the invention is characterized in that it consists of two thyristor bridges connected to the terminals of a center-tapped transformer and rectifying the magnetizing current, and of two current-measuring resistors, one of which measures the current flowing through the magnetizing winding and the other the current through the thyristor bridges.

DETAILED DESCRIPTION OF A PREFERRED EMBODIMENT

Figure 1:
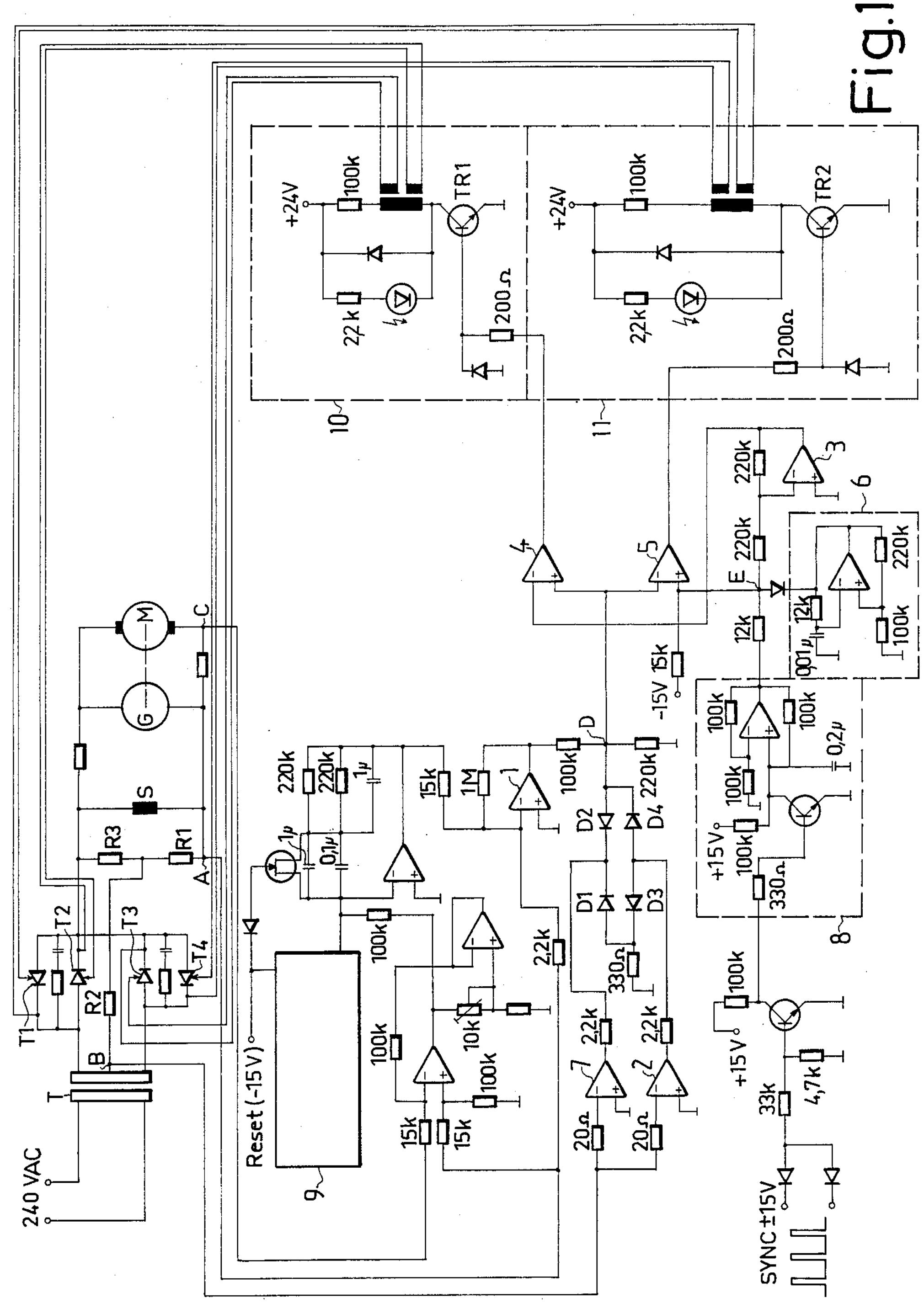
FIG. 1 presents an example of the circuit of the invention.

FIG. 1 shows an example of a Ward-Leonard power stage operating on the principle of the invention, controlling a direct current motor M by regulating the magnetization of the generator G supplying the motor. As is well known, this is done by adjusting the current through the magnetizing winding S. The magnetizing current is produced from the 240 V a.c. lighting voltage by means of the center-tapped transformer T and the thyristor T1–T4, which constitute two 1-phase full-wave thyristor bridges, one for each current direction. In accordance with the principle of the invention, the magnetizing circuit includes two current measuring points A and B, where the 0.1 Ohm resistors R1 and R2 are connected. The generator magnetization current is measured at point A and the corresponding information is supplied to the drive system current controller 1. The current through the active thyristor bridge is measured at point B and this information is supplied to the detector amplifiers 2 and 7, which keep the minimum pulses on until the thyristor current has fallen to zero.

The magnetization current of the motor M is measured at point C and the corresponding information is supplied to the speed reference circuit 9 of the drive system. As the operation of this circuit has been described in detail in our U.S. patent application Ser. No. 637,870, filed 8-6-84, it will not be explained in this context.

Prior-art magnetizing circuits include only one current measuring point, which generally indicates the magnitude of the magnetizing current. Under these circumstnces, short-circuit conditions arise in the first place from the use of limiters like resistor R3, needed to limit or eliminate the inductive excess voltages generated during emergency stops and in other exceptional circumstances. Since the currents so generated are not used for magnetization, the currents passing through the thyristor bridges may be fairly large even when the magnetizing current is zero and the device measuring the magnetizing current logically indicates zero current. As stated before, prior-art systems employ expensive mixer resistors to eliminate these currents. For the same reason, a device used for measuring the thyristor current cannot be used for detecting the magnetizing current. Accordingly, the idea of the invention is to measure these two currents separately, as shown in FIG. 1.

Next we will consider the pulse forming section of the drive system, which consists of the speed controller 1, thyristor current detector amplifiers 2 and 7, sawtooth wave oscillator 8, rectangular wave oscillator 6, comparators 4 and 5 determining the firing instant, and pulse transformer sections 10 and 11. In addition to these, the circuit comprise a number of other components, whose functions will be explained in the circuit description below. Items not shown in the drawing are the main voltage connection of the direct current motor, the power supply unit producing the +15 V and +24 V d.c. voltages, and the circuit producing the synchronizing pulses (SYNC ±15 V), all of which are considered as part of the routine work of a person skilled in the art.

The main principle of the circuit of the invention is to ensure that the conducting thyristor bridge is always in a full and continuous state of DC-to-AC conversion by applying pulses to the bridge for a certain minimum length of time. Energy is thus returned to the supply network, and the current declines quickly at the time of bridge changeover, leading to faster changing of the current direction. When the thyristor current is zero, the minimum pulses are removed and the bridge change-over can occur without the risk of a short-circuit condition arising.

In the circuit shown in FIG. 1, this is achieved in practice by ensuring, on the basis of the information obtained from the current measuring point B and by means of amplifiers 2 and 7 and diode bridge D1–D4, a certain minimum voltage level at point D, which automatically keeps the minimum pulses to the thyristor bridges T1,T2 or T3,T4 on when they are in the conducting state. The minimum pulses maintain DC-to-AC conversion in the thyristor bridges, thus enabling the energy of the magnetizing inductance to be returned to the supply network. In the circuit considered, the voltage at point D may vary between +1 V–+10 V in the case of positive magnetization, and between −10 V–−1 V in the case of negative magnetization. Within these limits, the value of the voltage at point D at any given instant is determined by the speed controller 1. The potential at point D will only become zero if the current measured at B is zero.

Figure 2:
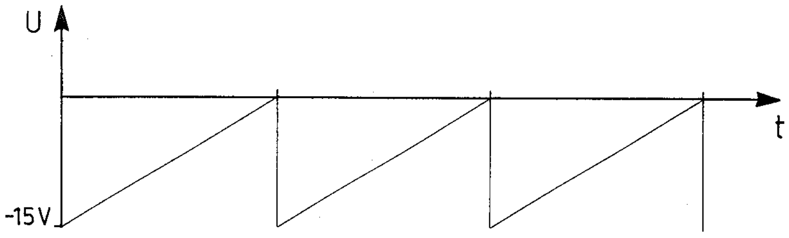
FIG. 2 presents the voltage waveform produced by the circuit in FIG. 1.
Figure 3:
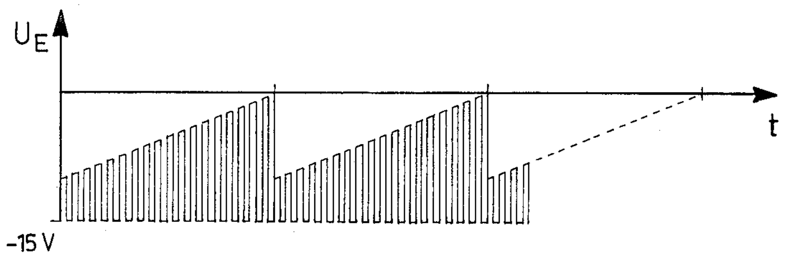
FIG. 3 presents a signal developed by the circuit from the waveform shown in FIG. 2.
Figure 4:
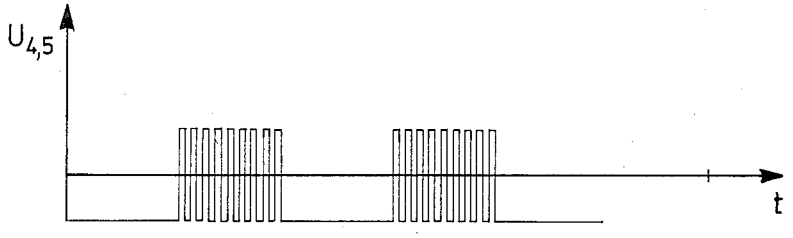
FIG. 4 presents the signal applied to the control stage of the thyristor bridges in FIG. 1.

At the same time, the sawtooth oscillator 8 generates a sawtooth voltage wave of a frequency equal to that of the SYNC pulses, as shown in FIG. 2. The output of the rectangular wave oscillator 6 is connected to the output of oscillator 6 at point E, producing a voltage wave of the form shown in FIG. 3. This voltage and the inverted voltage produced from it by inverter 3 are applied, together with the voltage obtained from point D, to the inputs of comparators 4 and 5. As a result of the comparison, depending on the sign of the magnetizing current, either of the comparators will produce bursts of pulse signals as shown in FIG. 4. These signals serve as firing timing pulses for the thyristor bridges T1,T2 and T3,T4 and are fed to the transistors TR1 and TR2 controlling the pulse transformers in sections 10 and 11. The pulse transformers control the thyristor bridges T1,T2 and T3,T4 of the magnetizing circuit in the usual manner.

We have thus come full circle in our consideration of the circuit operation. The bridge changeover takes place automatically via the current measuring and control electronics described above when the magnetizing current changes direction. At the time of this current direction change, when no current flows, the current obtained from point B to control the comparators is reduced to zero, and consequently the minimum pulses are extinguished. When the magnetizing current again appears at point B, this time flowing in the opposite direction, the comparator control current from point B is restored and the one of the comparators 4,5 that was inactive before now starts to supply firing timing pulses as shown in FIG. 4 to the pulse transformer section.

It is obvious to a person skilled in the art that the invention is not exclusively confined to the embodiment discussed above as an example, but may be varied within the scope of the claims presented below.

We claim:

1. In a dynamic converter drive for a direct current elevator motor including:

a 240 V ac power supply;

a generator, having a magnetizing circuit and a magnetizing winding, linked to the motor;

a center-tapped transformer and two thyristor bridges for providing power to the magnetizing winding;

a speed control unit;

a power electronics stage having a changeover control unit;

a diode bridge;

a sync ±15 power supply and a first and a second pulse controlling units for controlling the input current to the thyristor bridges depending on their input voltage;

the motor being controlled by adjusting the magnetization of the generator using at least the elevator speed and the motor current consumption;

a method for improving the dynamic converter drive comprising the steps of:

measuring a first current at a first point of said magnetizing circuit, said first current indicating the generator magnetizing current value which is supplied to the speed control unit;

measuring a second current at a second point of said magnetizing circuit, said second current representing the value of current in the thyristor bridges which is supplied to the changeover control unit of the power electronics state;

supplying said first current and second current to the diode bridge so that said diode bridge constantly supplies at least a minumum output voltage to said thyristor bridges whereby a continuous DC-to-AC conversion occurs in said thyristor bridges, the value of said minimum output voltage being determined by said speed controller unit;

generating a sawtooth wave having a frequency equal to that of said sync ±15 V power supply;

generating a rectangular wave;

combining said sawtooth wave and said rectangular wave to generate a combined wave;

determining the difference between the voltage of said combined wave and said minimum output voltage to produce a first set of pulse signals;

determining the difference between the voltage of the inverse of said combined wave and said minimum output voltage to produce a second set of pulse signals;

feeding said first and second sets of pulse signals to said first and second pulse controlling units, respectively;

whereby said thristor changeover takes place automatically when the magnetizing current changes direction, and whereby no current flows when said first current is equal to zero.

2. A method in accordance with claim 1, in which the power electronics stage consists of two thyristor bridges rectifying the magnetizig current in opposite directions, the bridge changeover being accomplished by means of a current direction control unit on the minimum pulse principle at the instant when the information from the aforesaid second current measuring point indicates that the current through the thyristor bridges is zero.

3. A method in accordance with claim 2, in which the said thyristor bridges are connected to the terminals of a center-tapped transformer.

4. A magnetizing circuit for a Ward-Leonard type dynamic converter, designed for implementing the method according to claim 1, consisting of two thyristor bridges rectifying the magnetizing current, the bridges being connected to the terminals of a center-tapped transformer, and of two current-measuring resistors, one of which measures the current flowing through the magnetizing winding and the other the current through the thyristor bridges.

* * * * *